United States Patent [19]
Kikinis

[11] Patent Number: 5,792,025
[45] Date of Patent: Aug. 11, 1998

[54] METHOD AND APPARATUS FOR REDUCING REPETITIVE MOTION INJURY RISK TO TYPIST AND POINTER-DEVICE OPERATORS

[75] Inventor: Dan Kikinis, Saratoga, Calif.

[73] Assignee: Lextron Systems, Inc., Saratoga, Calif.

[21] Appl. No.: 763,127

[22] Filed: Dec. 11, 1996

[51] Int. Cl.$^6$ ................................................ G01H 11/00
[52] U.S. Cl. ......................... 482/1; 482/4; 434/227; 434/229; 364/508; 364/550; 601/33
[58] Field of Search ................................. 434/227, 229; 364/508, 550, 551.01; 601/33; 482/1–4, 900

[56] References Cited

U.S. PATENT DOCUMENTS 5,305,238   4/1994   Starr et al. ........................ 364/569

Primary Examiner—Glenn E. Richman
Attorney, Agent, or Firm—Donald R. Boys

[57] ABSTRACT

A system to reducing repetitive motion injury (RMI) risks comprises a wrist-resting device having one or both of a heater and a vibrator in the device. In preferred embodiments edges of a support pad for the device are rounded significantly to avoid the possibility of sharp edges impeding a user's blood circulation. In another aspect a control system is provided for monitoring user activity and weighting each instance of activity according to stored parameters to accumulate data on user stress level. In the event a prestored stress threshold is reached, a media player is invoked to provide rest and exercise for the user.

6 Claims, 3 Drawing Sheets

METHOD AND APPARATUS FOR REDUCING REPETITIVE MOTION INJURY RISK TO TYPIST AND POINTER-DEVICE OPERATORS

FIELD OF THE INVENTION

The present invention is in the area of apparatus and methods for preventing occupational injuries. The invention pertains more particularly to a devices and methods for preventing wrist and hand injuries such as tenosynovitis, karpal tunnel syndrome and other Repetitive Motion Injuries (RMI).

BACKGROUND OF THE INVENTION

In recent years many court cases have been argued about repetitive motion injury, commonly referred to as RMI. The theory of RMI is, that by having to accomplish many small and similar motions, some requiring a person to exert relatively large forces, tendon connections in the hand, wrist, and surrounding tissue may become painfully swollen. If the person continues the repetitive micro-motion activity, which many people have to do because of occupational or avocational situations, tendons and connective tissue may become so damaged that the wrists and hands may become disabled.

In one common type of RMI, tissue surrounding tendons becomes swollen at a location near the root of the hand, where the tendons pass through a narrow tunnel, called the karpal tunnel. This malady is commonly referred to as karpal tunnel syndrome.

In another common type of RMI, termed tenosynovitis, the synovium, which sheathes the tendons that work fingers and thumbs, becomes swollen and stiff from repetitive similar motions. Once these tendon connections become swollen and stiff, every motion becomes difficult and painful.

There does not appear to be any single cause for karpal tunnel syndrome, tenosynovititis, or other hand and wrist RMIs. However, many people who spend much time interfacing with personal computers, particularly using a mouse, trackball, keyboard, sketchpad, or the like, develop these disorders.

There are devices and methods in current art that are designed to reduce RMI risk for users of hand-driven computer input devices. Some of these RMI risk reduction devices include personal computer software that periodically reminds an operator to take a break after a given number of keystrokes or mouse clicks, a time interval, or both. During a suggested break some RMI risk reduction devices lead a PC user through a series of wrist and finger relaxing exercises provided on video, audio, or both.

Other RMI risk reduction devices include wrist pads that are placed in front of a PC keyboard to keep the wrist-to-finger angle at a minimum and provide a resting place for the wrist to reduce strain. Current art in RMI reduction also places great emphasis on ergonomics, such as selecting the proper type of chair, correct sitting position and arm angle, and so on. It seems, however, that these conventional products and techniques fail to counter RMI risks for a computer operator.

A problem with current RMI-reduction software for PCs, such as those that tell an operator when to take a break and to do exercises or rest, is that the break initiation criteria are based on generalized data, such as a number of key strokes or mouse clicks, and the like, that an operator may have performed at a computer using the software. Current RMI reduction software typically does not take into account other relevant RMI risk determining criteria, such as when, how often, and how far a PC operator moves from a pointer device to a keyboard, or vice-versa. These programs typically also do not consider how often or how long the PC operator takes a coffee break or stops for other work.

Another RMI risk-determining criteria that is often missing from current applications is the distance of or variations of types of pointer device movement an operator may make during computer operation activity. These relevant criteria provide significant input on how much actual stress is reduced by periodic rests and different movements that may reduce stress. If included in RMI risk criteria, such criteria provide a more accurate measurement of the level of stress than the criteria used in current art, and will provide more efficient overall operator operation.

A problem with current wrist pads in front of a keyboard is that such keypads are made from substantially rigid foam rubber or gel filled bags that provide soft support in some areas, but which also too often feature sharp edges. Such sharp edges press against veins on the bottom of a user's wrist and deplete blood circulation to the wrist and fingers, further aggravating RMI risk for the fingers and hands.

A problem with emphasis on ergonomics, such as the type of chair being used, the correct sitting positions and arm angle, and the like, is that these criteria depend on constant vigilance from the PC operator to change bad posture practices.

What is clearly needed is a method and apparatus that reduces RMI stress to wrist and fingers without depleting blood circulation and provides a PC user rest and exercise at optimum intervals based on comprehensive criteria that maximize overall operator efficiency.

SUMMARY OF THE INVENTION

In a preferred embodiment of the present invention a wrist pad is provided for supporting a user's wrists during computer operation. The wrist pad of the invention comprises a pliable pad; and a heater enclosed within the pliable pad. In some embodiments there is additionally on-off and temperature control for the heater, and in others heater control is provided by software routines executed on a PC. In many preferred embodiments the pliable pad has an upper surface having peripheral edges, and at least one of the edges is rounded by a radius of one-eighth inch or more to avoid circulation impediment for a user.

In an alternative preferred embodiment of the present invention a wrist pad for supporting a user's wrists during computer operation is provided comprising a pliable pad and a vibrator enclosed within the pliable pad. In this alternative embodiment there may also be one or more of on-off, frequency, and magnitude control for the vibrator, and these may additionally be provided by computer software. Further such dual-function pads may also have one or more significantly rounded edges.

In another aspect of the invention a system for minimizing repetitive motion injury (RMI) risk in computer operation is provided, comprising a monitor for tracking user operations; a stored parameter table having specific information related to stress accumulation; an accumulator for accruing stress level for the user; and a media player. The accumulator calculates accrued increments of stress based on tracked user operations and parameters from the parameter table, keeps a current stress accumulation level for the user, and invokes the media player in the event that stress level exceeds a preset threshold. The monitor tracks user operations by monitoring interrupts generated by computer input devices including keyboard and pointer devices.

The wrist pad and monitoring system according to embodiments of the present invention provides a comprehensive and complete system for minimizing, or eliminating altogether RMI risk a attendant to computer operations.

DESCRIPTION OF THE PREFERRED EMBODIMENTS

In the present invention apparatus and methods are provided adapted to facilitate reduction in RMI risks to an operator of a computer keyboard, a mouse, a trackball, a sketch pad, and the like. In some embodiments of the present invention heaters and vibrators are provided in wristpads, and substantially rounded edges are provided as a further enhancement. Comprehensive control routines are also provided that use comprehensive criteria to determine rest and exercise periods.

Figure 1A:
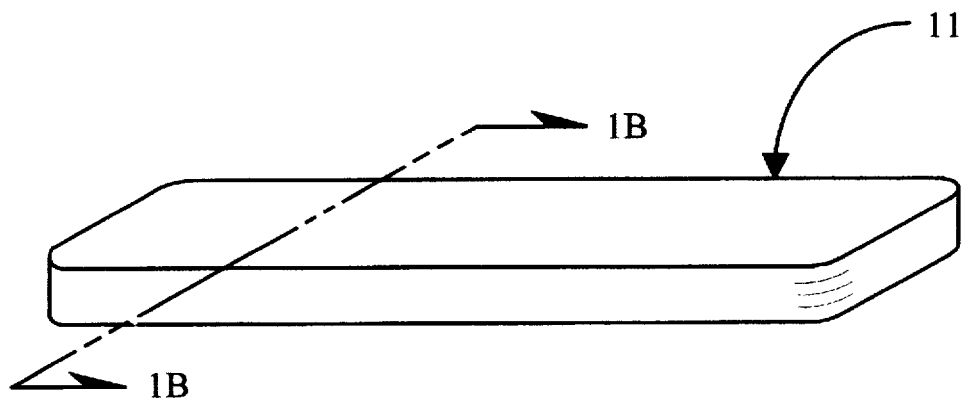
FIG. 1A is a perspective view of an apparatus in a preferred embodiment of the present invention.

FIG. 1A is a perspective view of a wristpad 11 in a preferred embodiment of the present invention, comprising a built-in heater and vibrating element (not shown in FIG. 1A). Wristpad 11 has rounded edges.

The inventor believes that that heat applied to sensitive areas increases blood flow and reduces pain at and near those areas. Also, a vibrating pad placed on a sensitive area increases blood flow and relaxes tissue and muscles.

A computer operator's wrists rest on wrist pad 11 while the operator is engaged in typing or operating pointer devices and the like, and the operator's wrists are heated and vibrated to promote increased blood flow and relaxed tissue on and around the user's karpal tunnel to reduce the risk of RMI to tendons and surrounding tissue.

Figure 1B:
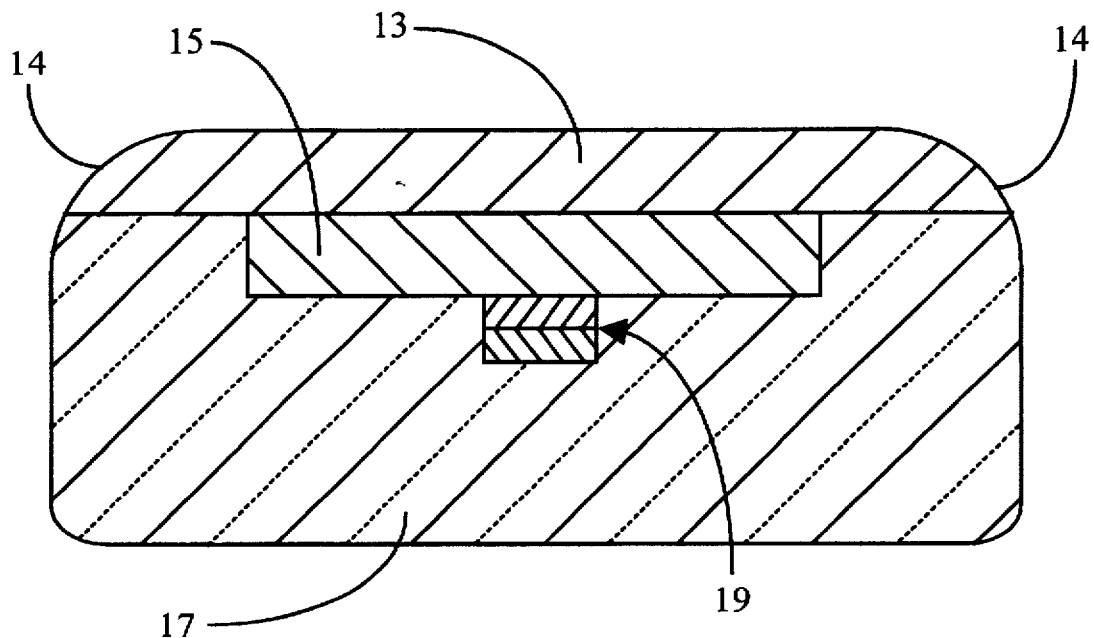
FIG. 1B is a cross-sectional view of the apparatus of FIG. 1A taken along section line 1B—1B of FIG. 1A.

FIG. 1B is a cross-sectional view of wristpad 11 taken along section line 1B—1B of FIG. 1A. Wristpad 11 as seen in FIG. 1B has a top layer 13 having rounded edges 14, a heater 15, a vibrator 19, and a bottom foam block 17.

Wrist pad top layer 13 is made from any one of many types of currently available material that has a soft, warm texture to provide a comfortable wrist-resting cushion. Rounded edges 14 provide a smooth, unobtrusive surface for a user's wrists to rest on without compressing the veins under the wrist, and reducing blood circulation, such as sharp-edged wrist pads may do. It is recognized by the inventors that rounded edges may be taken generically and is a subjective term, open to opinion and interpretation. By rounded edges the inventor means that the edges where a user's wrists normally rest are substantially rounded over what is commonly seen in the art. In many devices edges are rounded by a small amount, such as a sixteenth of an inch for example, to facilitate taking products from a mold, for example. In devices according to the present invention rounding is more pronounced, such as at least a radius of one-eighth inch and as much as one-quarter of an inch or more, to give real relief and obviate the possibility of a sharp (or nominally rounded) edge impairing circulation for an operator or user.

Heater 15 provides heat for relief from pain and discomfort at a computer operator's wrist area, and for increasing blood flow. Heater 15 may be any of many safe and simple AC or low DC voltage heaters. Heater can be turned on and off, and its temperature can be controlled by any suitable mechanism, such as an on/off vernier resistor or PC software using a special interface or by using a universal serial bus (USB) connected to a keyboard, and the like.

Vibrator 19 can be any one of many suitable vibration mechanisms, such as one or more unbalanced rotors on a shaft of a high-speed electric motor, or the like. Vibrator 19 can be turned on and off, and its frequency and intensity can be controlled by any suitable mechanism, such as an on/off vernier resistor or PC software using a special interface or by using a universal serial bus (USB) connected to a keyboard and the like.

Foam block 17 provides a base and support for the wrist pad.

Figure 2:
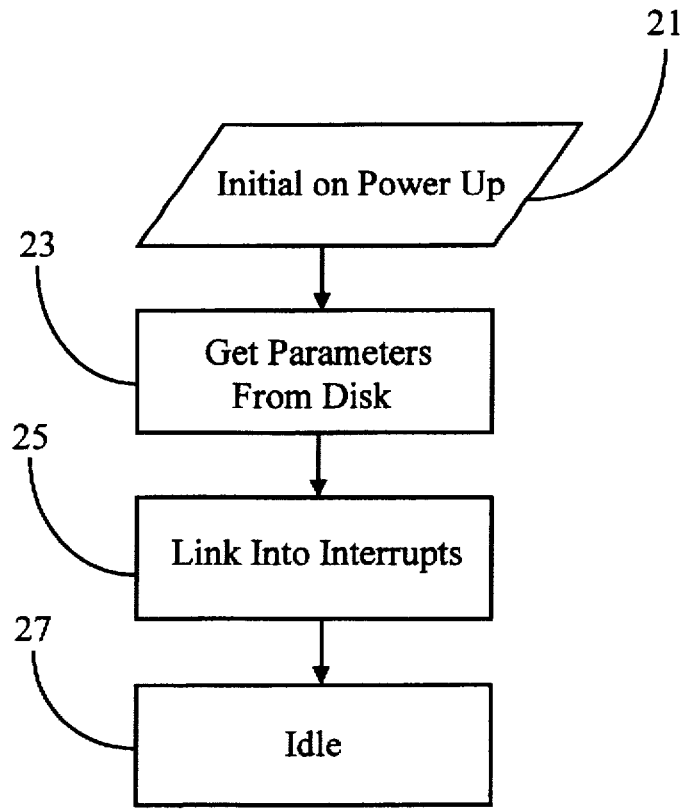
FIG. 2 is a flow diagram illustrating control flow in operational routines adapted for initializing interrupt handling in an embodiment of the present invention.
Figure 3:
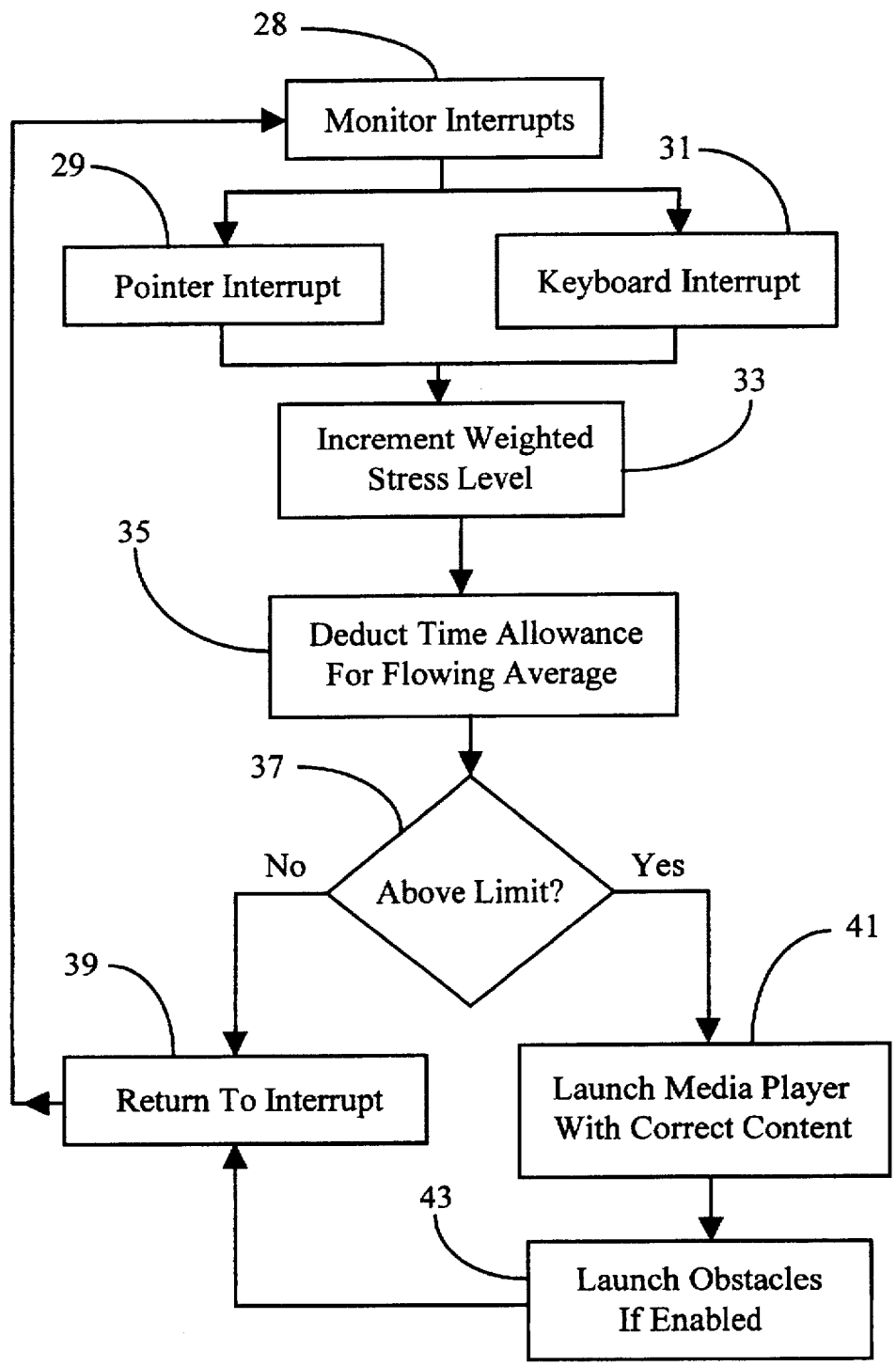
FIG. 3 is a flow diagram illustrating interrupt handling procedures according to an embodiment of the present invention.

FIGS. 2 and 3 are flow diagrams for control routines that initialize interrupt handling and perform interrupt handling procedures according to the present invention. Not shown, but well known in the art, are setup software routines that generate a parameter table and store it in non-volatile memory and software routines that operate a media player.

FIG. 2 is a flow diagram for the basic software routines for initializing interrupt handling according to the present invention. Initialization procedure is started during initial power up procedures at step 21 by including a driver into one of the start-up configuration files, such as autoexec.bat, config.sys, and the like. Interrupt handling procedures and parameters are taken from storage at step 23 and linked to the keyboard and pointer device interrupts at step 25. It will be apparent to those with skill in the art that the control routines may be stored in a variety of ways, such as on non-volatile disk media, such as a hard disk or CD, or may be part of an on-board ROM or a part of an operating system.

Interrupt parameters include such items as information on the type of keyboard and pointer devices, the user's chirality, distance between a keyboard and a pointer device, and other user and system-specific parameters. These parameters can be customized to suit a particular physical layout and a user's preferences and characteristics. In some embodiments an interactive setup screen is displayed on demand for setup and configuration, during which process a user has an opportunity to customize the control parameters and constants.

Control of the PC is ceded to operating system software routines at step 27.

FIG. 3 is a flow diagram for interrupt handling procedures according to the present invention. The system monitors operator activity in real time, and step 28 indicates monitoring of interrupts produced by operator activity. When a user operates the keyboard or a pointer device, or other device producing an interrupt, the system recognizes the activity at one or both of steps 29 and 31. It will be apparent to those with skill in the art that there may be several more monitoring steps, and the steps indicating monitoring of keyboard and pointer activity are exemplary.

Based on pointer device movement and clicks and keyboard strokes from steps 29 and 31, software routines in step 33 calculate accrual in stress. Calculation is weighted by parameters such as how far a pointer device has moved since the last interrupt, how many times a user's hand has moved from the keyboard to the pointer device and vice versa, number of keystrokes, number of pointer device clicks, and the like. An allowance for elapsed time is then deducted at step 35 to compensate for coffee breaks and other extended inactivity, which reduces the RMI stress level. The allowance of time does not need to be a linear function of time, but can also be in logarithmic shape as a Stress-curve.

At step 37 the system checks if the aggregate stress level has reached a preset upper limit. If the upper stress limit has not been reached, control is directed at step 39 to continue monitoring interrupts, that is: control is sent back to step 28.

If the upper stress limit has been reached, software routines (in some embodiments) block further computer operation and launch a media player having activity for RMI control. Those with skill in the art will recognize that the media player may be of many available sorts, such as stored video and the like. A presentation provided, typically on the computer operator's video monitor, provides exercises, meditation, music, or a combination of any or all of these and other helpful activities. The type of media player presentation is tailored in specific embodiments of the invention to specific types of stress possibly induced.

What is claimed is:

1. A system for minimizing repetitive motion injury (RMI) risk in computer operation, the system comprising:

a monitor for tracking user operations;

a stored parameter table having specific information related to stress accumulation; and an accumulator for accruing stress level for the user;

wherein the accumulator calculates accrued increments of stress based on tracked user operations and parameters from the parameter table, keeps a current stress accumulation level for the user, and blocks further user input in the event current stress accumulation for a user exceeds a pre-programmed threshold stress level.

2. The system of claim 1 wherein the monitor tracks user operations by monitoring interrupts generated by at least one computer input device.

3. The system of claim 1 wherein, after user input is blocked, the system causes a computer for which inputs are monitored to display a graphic presentation to the user on a video display, the presentation including one or more specific exercises for a user to perform.

4. A personal computer (PC) comprising:

a CPU;

a memory;

a video display monitor;

user input devices; and a system for minimizing repetitive motion injury (RMI) risk;

wherein the system for reducing RMI risk includes a monitor for tracking user operations; a stored parameter table having specific information related to stress accumulation; and an accumulator for accruing stress level for the user, wherein the accumulator calculates accrued increments of stress based on tracked user operations and parameters from the parameter table, keeps a current stress accumulation level for the user, and blocks further user input in the event current stress accumulation for a user exceeds a pre-programmed threshold stress level.

5. The PC of claim 4 wherein the monitor tracks user operations by monitoring interrupts generated by at least one computer input device.

6. The PC of claim 4 wherein, after user input is blocked, the system causes a computer for which inputs are monitored to display a graphic presentation to the user, the presentation including one or more specific exercises for a user to perform.

* * * * *